(12) United States Patent
Wada et al.

(10) Patent No.: US 11,226,449 B2
(45) Date of Patent: Jan. 18, 2022

(54) REINFORCEMENT STRUCTURE

(71) Applicant: FUJIKURA LTD., Tokyo (JP)

(72) Inventors: Shogo Wada, Sakura (JP); Kensuke Yoshida, Sakura (JP)

(73) Assignee: FUJIKURA LTD., Tokyo (JP)

( * ) Notice: Subject to any disclaimer, the term of this patent is extended or adjusted under 35 U.S.C. 154(b) by 511 days.

(21) Appl. No.: 16/316,122

(22) PCT Filed: May 31, 2017

(86) PCT No.: PCT/JP2017/020262
§ 371 (c)(1),
(2) Date: Jan. 8, 2019

(87) PCT Pub. No.: WO2018/025486
PCT Pub. Date: Feb. 8, 2018

(65) Prior Publication Data
US 2021/0286131 A1 Sep. 16, 2021

(30) Foreign Application Priority Data
Aug. 1, 2016 (JP) .............................. JP2016-151101

(51) Int. Cl.
*G02B 6/255* (2006.01)
(52) U.S. Cl.
CPC .................. *G02B 6/2558* (2013.01)
(58) Field of Classification Search
None
See application file for complete search history.

(56) References Cited

U.S. PATENT DOCUMENTS

| 8,274,732 B2 | 9/2012 | Tamaoki |
| 2009/0263088 A1* | 10/2009 | Miyamori ............ G02B 6/2553 385/96 |
| 2010/0188735 A1 | 7/2010 | Tamaoki |

(Continued)

FOREIGN PATENT DOCUMENTS

| CN | 102667557 A | 9/2012 |
| JP | 63-188606 U | 12/1988 |

(Continued)

OTHER PUBLICATIONS

European Search Report dated Dec. 17, 2019, issued in counterpart application No. 17836593.8. (8 pages).

(Continued)

*Primary Examiner* — Tina M Wong
(74) *Attorney, Agent, or Firm* — Westerman, Hattori, Daniels & Adrian, LLP

(57) ABSTRACT

An embodiment of the present invention makes it possible provide a reinforcement structure which (i) makes it possible to reinforce an optical fiber in a simple manner and (ii) decreases the likelihood of degradation of a heat-shrinkable tube. A reinforcement structure (1) includes a tension-resistance member (13), a heat-shrinkable tube (16) which bundles a plurality of optical fibers (11, 12) and the tension-resistance member (13), and a radiator (15) which is in thermal contact with the tension-resistance member (13). The tension-resistance member (13) has a flat surface which faces respective circumferential surfaces of the plurality of optical fibers (11, 12).

7 Claims, 7 Drawing Sheets

(56) References Cited

U.S. PATENT DOCUMENTS

| | | | |
|---|---|---|---|
| 2012/0170899 A1 | 7/2012 | Homma et al. | |
| 2012/0243838 A1 | 9/2012 | Sato et al. | |
| 2013/0308661 A1 | 11/2013 | Nishimura et al. | |
| 2016/0336711 A1 | 11/2016 | Tanaka | |
| 2018/0059323 A1* | 3/2018 | Rivera | G02B 27/10 |
| 2021/0048582 A1* | 2/2021 | Uchiyama | G02B 6/2558 |

FOREIGN PATENT DOCUMENTS

| | | |
|---|---|---|
| JP | 8-5858 A | 1/1996 |
| JP | 8-248256 A | 9/1996 |
| JP | 2004-356421 A | 12/2004 |
| JP | 2006-201264 A | 8/2006 |
| JP | 2009-115918 A | 5/2009 |
| JP | 2010-171322 A | 8/2010 |
| JP | 2013-47748 A | 3/2013 |
| JP | 2015-145960 A | 8/2015 |

OTHER PUBLICATIONS

International Search Report dated Aug. 15, 2017, issued in counterpart International Application No. PCT/JP2017/020262 (2 pages).
Notice Allowance dated Jul. 24, 2018, issued in counterpart of Japanese Patent Application No. 2016-151101. (2 pages).
Office Action dated Jan. 16, 2018, issued in counterpart of Japanese Patent Application No. 2016-151101. (2 pages).
Office Action dated Jul. 4, 2017, issued in counterpart of Japanese Patent Application No. 2016-151101. (2 pages).

* cited by examiner

REINFORCEMENT STRUCTURE

TECHNICAL FIELD

The present invention relates to a reinforcement structure for reinforcing a fusion splice point of an optical fiber.

BACKGROUND ART

Fiber lasers and other such fiber-optic systems that include a plurality optical fibers whose end faces have been fusion-spliced are used widely. Such fiber-optic systems often include a reinforcement structure for reinforcing the fusion splice point.

A typical example of a reinforcement structure for reinforcing a fusion splice point of an optical fiber is a configuration in which an optical fiber and a tension-resistance member are bundled together by a heat-shrinkable tube. By merely bundling an optical fiber and a tension-resistance member with use of a heat-shrinkable tube, it is possible to reinforce a fusion splice point of the optical fiber in a simple manner. Such a reinforcement structure is disclosed in, for example, Patent Literatures 1 and 2.

CITATION LIST

Patent Literature

[Patent Literature 1]
Japanese Utility Model Application Publication, Jitsukai-sho, No. 63-188606 (Dec. 2, 1988)
[Patent Literature 2]
Japanese Patent Application Publication, Tokukaihei, No. 8-248256 (Sep. 27, 1996)

SUMMARY OF INVENTION

Technical Problem

In the reinforcement structure disclosed in Patent Literature 1, light which leaks from the optical fiber in the heat-shrinkable tube heats the heat-shrinkable tube. Problematically, this can cause the heat-shrinkable tube to degrade.

The present invention has been made in view of the above problem. An object of the present invention is to provide a reinforcement structure which (i) has a simple configuration in which an optical fiber and a tension-resistance member are bundled by use of a heat-shrinkable tube, and (ii) decreases the likelihood of degradation of the heat-shrinkable tube.

Solution to Problem

In order to solve the above problem, a reinforcement structure in accordance with an aspect of the present invention is a reinforcement structure for reinforcing a fusion splice point at which a plurality of optical fibers are fusion-spliced, the reinforcement structure including: a tension-resistance member; a heat-shrinkable tube which bundles the plurality of optical fibers and the tension-resistance member; and a radiator which is in thermal contact with the tension-resistance member, the tension-resistance member having a flat surface which faces respective circumferential surfaces of the plurality of optical fibers.

Advantageous Effects of Invention

An embodiment of the present invention makes it possible provide a reinforcement structure which (i) makes it possible to reinforce an optical fiber in a simple manner and (ii) decreases the likelihood of degradation of a heat-shrinkable tube.

DESCRIPTION OF EMBODIMENTS

Embodiment 1

(Configuration of Reinforcement Structure)

Figure 1:
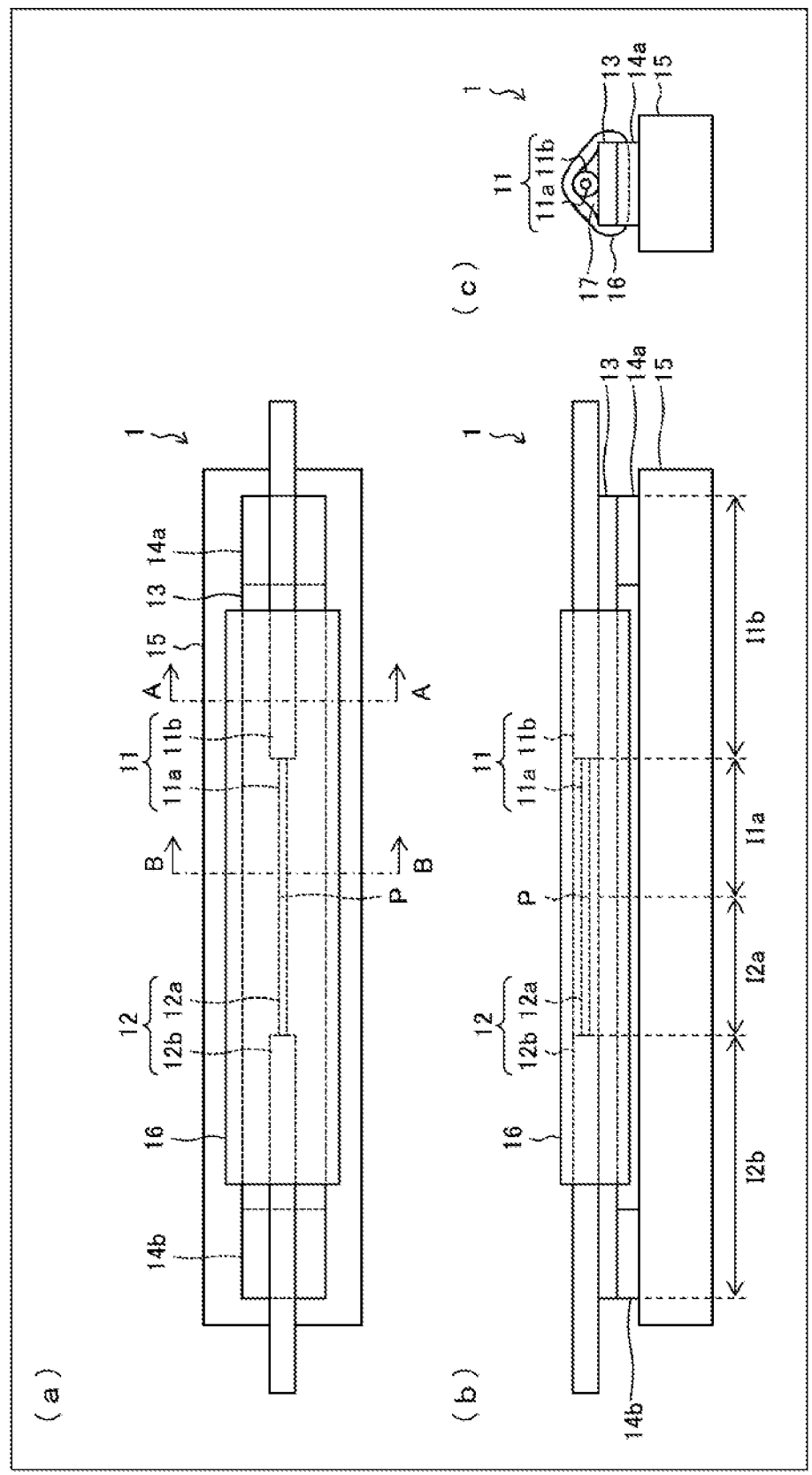
FIG. 1 illustrates a reinforcement structure in accordance with Embodiment 1 of the present invention. (a) of FIG. 1 is a top view of the reinforcement structure. (b) of FIG. 1 is a right side view of the reinforcement structure. (c) of FIG. 1 is a front view of the reinforcement structure.
Figure 2:
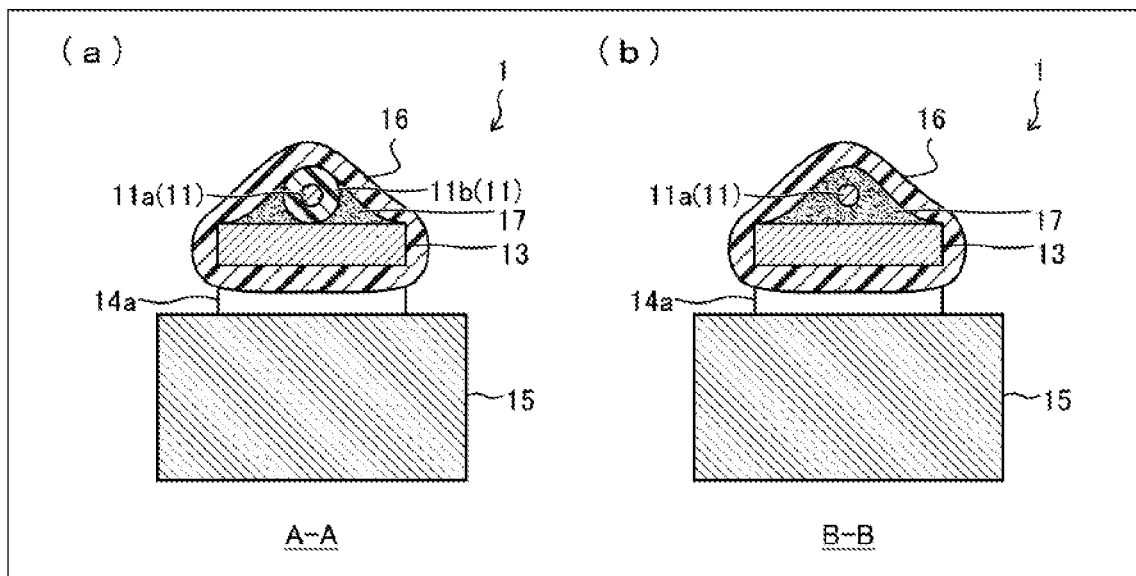
FIG. 2 further illustrates the reinforcement structure illustrated in FIG. 1. (a) of FIG. 2 is a cross-sectional view of an adjacent section the reinforcement structure (taken along line A-A). (b) of FIG. 2 is a cross-sectional view of a jacket-removed section of the reinforcement structure (taken along line B-B).

The following description will discuss, with reference to FIGS. 1 and 2, a reinforcement structure 1 in accordance with Embodiment 1 of the present invention. (a) of FIG. 1 is a top view of the reinforcement structure 1. (b) of FIG. 1 is a right side view of the reinforcement structure 1. (c) of FIG. 1 is a front view of the reinforcement structure 1. (a) of FIG. 2 is a cross-sectional view of the reinforcement structure 1, taken along line A-A. (b) of FIG. 2 is another cross-sectional view of the reinforcement structure 1, taken along line B-B.

The reinforcement structure 1 is a structure for reinforcing a fusion splice point P at which an optical fiber 11 and an optical fiber 12 are fusion-spliced. The reinforcement structure 1 includes a tension-resistance member 13, a leg part 14a, a leg part 14b, a radiator 15, a heat-shrinkable tube 16, and a low-refractive-index resin 17.

The optical fiber 11 includes (i) a bare fiber part 11a made of glass and (ii) a jacket 11b which is made of resin and covers a circumferential surface of the bare fiber part 11a. The jacket 11b has been removed in a section (hereinafter, "jacket-removed section") 11a including the fusion splice point P. Similarly, the optical fiber 12 includes (i) a bare fiber part 12a made of glass and (ii) a jacket 12b which is made of resin and covers a circumferential surface of the bare fiber part 12a. The jacket 12b has been removed in a section (hereinafter, "jacket-removed section") I2a including the fusion splice point P.

The tension-resistance member 13 has a flat surface and is provided so that the flat surface faces the circumferential surfaces of the optical fibers 11 and 12 at least in the jacket-removed sections I1a and I2a. In the present embodiment, the tension-resistance member 13 is a plate-like member which is provided such that an upper surface of the plate-like member faces the circumferential surfaces of the optical fibers 11 and 12 in (i) the jacket-removed sections I1a and I2a and (ii) adjacent sections I1b and I2b, which are adjacent to the jacket-removed sections I1a and I2a, respectively. The upper surface of the tension-resistance member 13 has a width which is greater than the diameter of the optical fibers 11 and 12. A material to be used for the tension-resistance member 13 need only have a high elastic modulus (at least higher than the elastic modulus of the bare fiber parts 11a and 12a) and a high thermal conductivity. Examples of suitable materials for the tension-resistance member 13 include copper, copper molybdenum, and other metals.

The leg part 14a is provided to a front end of a lower surface of the tension-resistance member 13. The leg part 14b is provided to a rear end of the lower surface of the tension-resistance member 13. The tension-resistance member 13 is in thermal contact with the radiator 15 (described later) via the leg parts 14a and 14b. The leg parts 14a and 14b may be members separate from the tension-resistance member 13 which have been bonded to the tension-resistance member 13, or may be members which are a part of the tension-resistance member 13 and have been provided integrally with tension-resistance member 13. In the present embodiment, the leg parts 14a and 14b are each a member which (i) has a rectangular parallelepiped shape, (ii) has a height greater than a thickness of the heat-shrinkable tube 16, and (iii) has been bonded to the front end or rear end of the lower surface of the tension-resistance member 13. A material to be used for the leg parts 14a and 14b need only have a thermal conductivity which is approximately equal to that of the tension-resistance member 13. Examples of suitable materials for the leg parts 14a and 14b include copper, copper molybdenum, and other metals.

The radiator 15 is a member for externally dissipating heat, specifically heat which has been conducted from the tension-resistance member 13 via the leg parts 14a and 14b. In the present embodiment, a known water-cooled plate is used as the radiator 15. Instead of a water-cooled plate, a known air-cooled plate may be used as the radiator 15.

The heat-shrinkable tube 16 is a tubular member which bundles the optical fibers 11 and 12 and the tension-resistance member 13. A material to be used for the heat-shrinkable tube 16 need only be heat-shrinkable. Examples of suitable materials for the heat-shrinkable tube 16 include a fluorocarbon resin such as (poly)tetrafluoroethylene (PTEF) and an olefin resin such as polyethylene (PE).

Because the tension-resistance member 13 has a width which is greater than the diameter of the optical fibers 11 and 12, the heat-shrinkable tube 16 after being shrunk takes on a contour which is mountain-like when viewed in a cross section, as illustrated in (c) of FIG. 1, and in (a) and (b) of FIG. 2.

In the adjacent sections I1b and I2b, an inner circumferential surface of the heat-shrinkable tube 16 is in close contact with (i) the lower surface and side surfaces of the tension-resistance member 13 and (ii) respective upper portions of the circumferential surfaces of the optical fibers 11 and 12 (outer circumferential surface of the jacket 11b), as illustrated in (a) of FIG. 2. Furthermore, in the adjacent sections I1b and I2b, two small gaps are formed to the left and right of the optical fibers 11 and 12. The small gaps are surrounded by the circumferential surfaces of the optical fibers 11 and 12, the upper surface of the tension-resistance member 13, and the inner circumferential surface of the heat-shrinkable tube 16. In the jacket-removed sections I1a and I2a, the inner circumferential surface of the heat-shrinkable tube 16 is in close contact with the lower surface and side surfaces of the tension-resistance member 13, as illustrated in (b) of FIG. 2. Furthermore, in the jacket-removed sections I1a and I2a, a large gap surrounding the optical fibers 11 and 12 is formed. The large gap is surrounded by the upper surface of the tension-resistance member 13 and the inner circumferential surface of the heat-shrinkable tube 16. The large gap and the small gaps are filled with the low-refractive-index resin 17, which has a refractive index that is lower than that of cladding (outermost shells of the bare fiber parts 11a and 12a) of the optical fibers 11 and 12. A material for the low-refractive-index resin 17 need only (i) have a refractive index which is lower than the refractive index of the cladding of the optical fibers 11 and 12 and (ii) be a thermoplastic resin which softens at a temperature at which the heat-shrinkable tube 16 shrinks, and hardens at normal temperature. Examples of suitable materials for the low-refractive-index resin 17 include ethylene-vinyl acetate (EVA)

In this way, the reinforcement structure 1 is configured so that the heat-shrinkable tube 16 bundles the optical fibers 11 and 12 and the tension-resistance member 13. This makes it possible to reinforce the optical fibers 11 and 12 in a simple manner.

Furthermore, the reinforcement structure 1 is configured such that (i) the upper surface of the tension-resistance member 13 faces the circumferential surfaces of the optical fibers 11 and 12 and (ii) the tension-resistance member 13 is in thermal contact with the radiator 15 via the leg parts 14a and 14b. As such, even if light leaks from the circumferential surfaces of the optical fibers 11 and 12 in the heat-shrinkable tube 16, a large portion of the leaked light is converted into heat in the tension-resistance member 13, and a large portion of that heat is dissipated via the radiator 15. This makes it possible to decrease the likelihood of degradation of the heat-shrinkable tube 16 caused by light which leaks from the circumferential surfaces of the optical fibers 11 and 12 and heats the heat-shrinkable tube 16.

Furthermore, the reinforcement structure 1 is configured such that the heat-shrinkable tube 16 is filled with the low-refractive-index resin 17, which has a refractive index that is lower than the refractive index of the cladding of the optical fibers 11 and 12. This makes it possible to decrease the amount of light which leaks from circumferential surfaces of the optical fibers 11 and 12 in the heat-shrinkable tube 16. It is therefore possible to further decrease the likelihood of degradation of the heat-shrinkable tube 16 caused by light which leaks from the circumferential surfaces of the optical fibers 11 and 12 and heats the heat-shrinkable tube 16.

Furthermore, the reinforcement structure 1 includes the tension-resistance member 13, which is a plate-like member having a rectangular cross section. As such, in comparison to a configuration in which the tension-resistance member 13 is a rod-like member having a circular cross section, this makes it possible to reduce, out of light which leaks from the circumferential surfaces of the optical fibers 11 and 12, a proportion of light which is incident upon the heat-shrinkable tube 16. It is therefore possible to further decrease the likelihood of degradation of the heat-shrinkable tube 16 caused by light which leaks from the circumferential surfaces of the optical fibers 11 and 12 and heats the heat-shrinkable tube 16.

Figure 3:
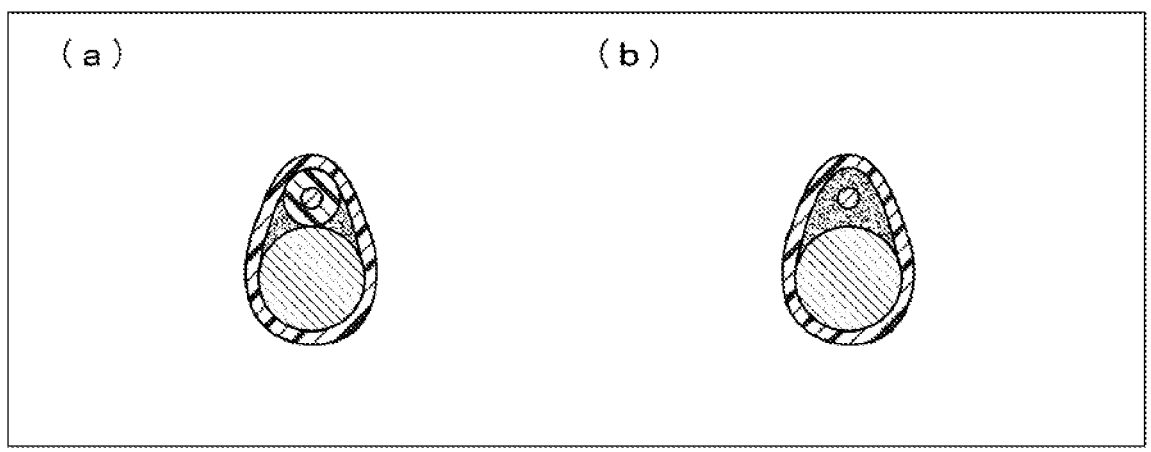
FIG. 3 illustrates a reinforcement structure in accordance with a comparative example. (a) of FIG. 3 is a cross-sectional view of an adjacent section the reinforcement structure. (b) of FIG. 3 is a cross-sectional view of a jacket-removed section of the reinforcement structure.

In order to confirm this, the comparative example illustrated in FIG. 3 is considered here. (a) of FIG. 3 is a cross-sectional view of an adjacent section of a reinforcement structure in accordance with the comparative example. (b) of FIG. 3 is a cross-sectional view of a jacket-removed section of the reinforcement structure in accordance with the comparative example. The reinforcement structure in accordance with the comparative example includes a tension-resistance member which is rod-like and has a circular cross section.

In the reinforcement structure 1 in accordance with the present embodiment, light which leaks at any direction within±approximately 120° of an upward direction is incident upon the heat-shrinkable tube 16, as can be seen from (b) of FIG. 2. However, in the reinforcement structure in accordance with the comparative example, light which leaks at any direction within±approximately 135° of an upward direction is incident upon a heat-shrinkable tube, as can be seen from (b) of FIG. 3. In other words, in the reinforcement structure 1 in accordance with the present embodiment, out of the light which leaks from the optical fibers 11 and 12, a proportion of light which is incident upon the heat-shrinkable tube 16 is less than that in the reinforcement structure in accordance with the comparative example. Note that even in the reinforcement structure in accordance with the comparative example, if the diameter of the tension-resistance member (the rod-like member having a circular cross section) is increased, it is possible to decrease this proportion so as to be approximately equal to that of the reinforcement structure 1 in accordance with the present embodiment. However, doing so would cause the reinforcement structure of the comparative example to have a much greater thickness than that of the reinforcement structure 1 of the present embodiment. In other words, the reinforcement structure 1 in accordance with the present embodiment makes it possible, without excessively increasing the thickness of the reinforcement structure 1, to decrease, out of the light which leaks from the circumferential surfaces of the optical fibers 11 and 12, the proportion of light which is incident upon the heat-shrinkable tube 16.

(Method of Producing Reinforcement Structure)

Figure 4:
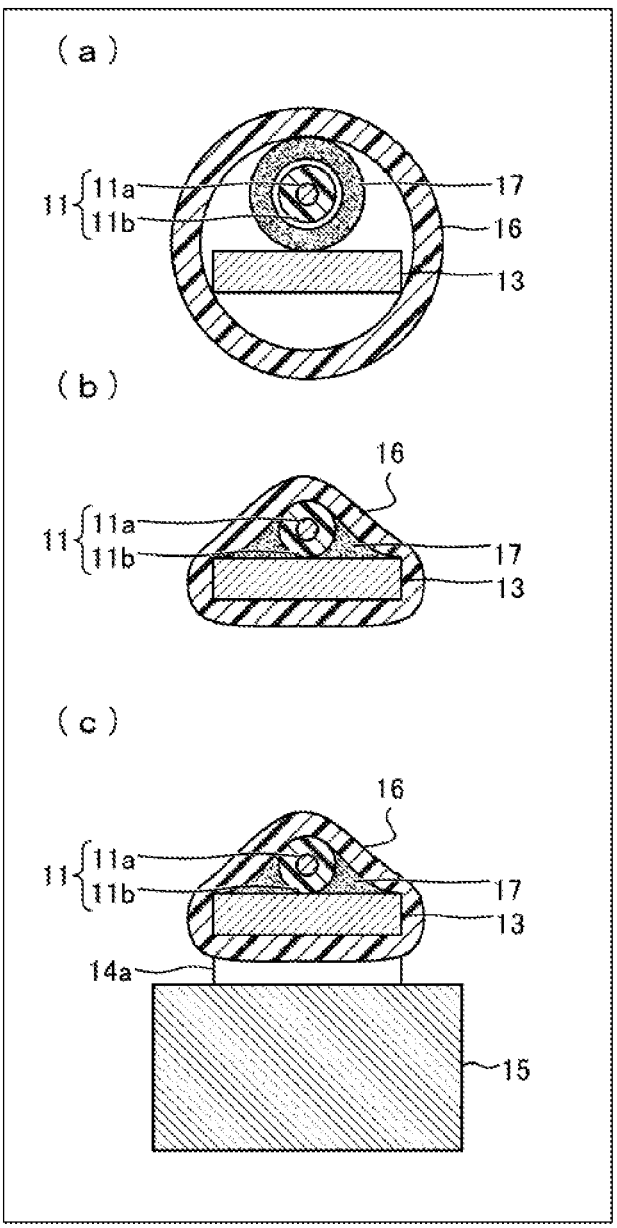
FIG. 4 illustrates a method of producing the reinforcement structure illustrated in FIG. 1. (a) to (c) of FIG. 4 are each a cross-sectional view of an adjacent section of the reinforcement structure as appears during production.

The following description will discuss a method of producing the reinforcement structure 1, with reference to FIG. 4. (a) to (c) of FIG. 4 are each a cross-sectional view of the reinforcement structure 1, taken in one of the adjacent sections I1b or I2b.

The reinforcement structure 1 can be produced by, for example, carried out the following steps in the following order.

Passing through step: First, the optical fiber 11 is passed through a resin tube 17, and the resin tube 17 and tension-resistance member 13 are passed through the heat-shrinkable tube 16. The resin tube 17 is a tubular member made from a thermoplastic resin and serves as a base material for the low-refractive-index resin 17.

Fusion splicing step: An end face of the optical fiber 11 is fusion-spliced to an end face of the optical fiber 12.

Sliding step: Next, the tension-resistance member 13, the resin tube 17, and the heat-shrinkable tube 16 are slid so that in the jacket-removed sections I1a and I2a and the adjacent sections I1b and I2b, the upper surface of the tension-resistance member 13 faces the respective circumferential surfaces of the optical fibers 11 and 12. (a) of FIG. 4 illustrates a cross section of the adjacent section I1a of the reinforcement structure 1, as appears after this step has been carried out.

Heating step: Next, the heat-shrinkable tube 16 and the resin tube 17 are heated. This shrinks the heat-shrinkable tube 16 and softens the resin tube 17. As a result, in the adjacent sections I1b and I2b, the inner circumferential surface of the heat-shrinkable tube 16 comes into close contact with (i) the lower surface and side surfaces of the tension-resistance member 13 and (ii) respective upper portions of the circumferential surfaces of the optical fibers 11 and 12 (the outer circumferential surface of the jacket 11b). In the adjacent sections 11b and 12b, the resin tube 17 which has softened becomes the low-refractive-index resin 17 which fills the small gaps to the left and right of the optical fibers 11 and 12. Further, in the jacket-removed sections I1a and I2a, the inner circumferential surface of the heat-shrinkable tube 16 comes into close contact with the lower surface and side surfaces of the tension-resistance member 13. In the jacket-removed sections I1a and I2a, the resin tube 17 which has softened becomes the low-refractive-index resin 17 which fills the large gap surrounding the optical fibers 11 and 12. (b) of FIG. 4 illustrates a cross section of the adjacent section I1a of the reinforcement structure 1, as appears after this step has been carried out.

Cooling step: The heat-shrinkable tube 16 and the low-refractive-index resin 17 are cooled (for example, by natural cooling). This causes the low-refractive-index resin 17 to harden.

Bonding step: Upper surfaces of the leg parts 14a and 14b are bonded to the lower surface of the tension-resistance member 13, and an upper surface of the radiator 15 is bonded to lower surfaces of the leg parts 14a and 14b. This establishes thermal contact between the tension-resistance member 13 and the radiator 15. (c) of FIG. 4 illustrates a cross section of the adjacent section I1a of the reinforcement structure 1, as appears after this step has been carried out.

Described above is an example method in which the fusion splicing step is carried out after the passing through step. Note, however, that a method of producing the reinforcement structure 1 is not limited to such an example. That is, it is possible to produce the reinforcement structure 1 using a method in which the passing through step is carried out after the fusion splicing step. Furthermore, in a case where the heat-shrinkable tube 16 prior to shrinking has an inner diameter which is large enough to allow the tension-resistance member 13 to pass through the heat-shrinkable tube 16 even after the leg parts 14a and 14b have been bonded to the tension-resistance member 13, a step of bonding the upper surfaces of the leg parts 14a and 14b to the lower surface of the tension-resistance member 13 may be carried out before the passing through step.

Embodiment 2

Figure 5:
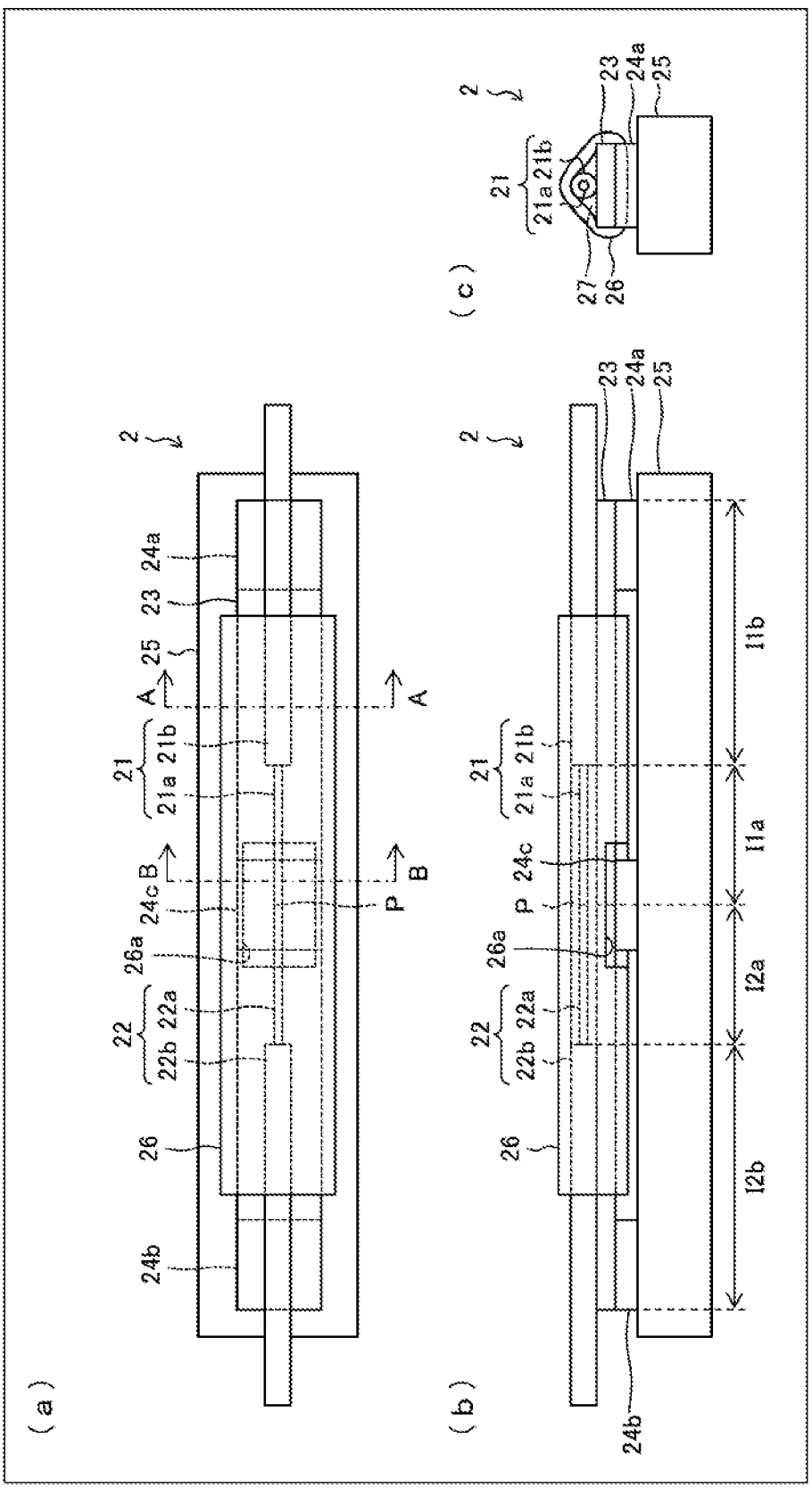
FIG. 5 illustrates a reinforcement structure in accordance with Embodiment 2 of the present invention. (a) of FIG. 5 is a top view of the reinforcement structure. (b) of FIG. 5 is a right side view of the reinforcement structure. (c) of FIG. 5 is a front view of the reinforcement structure.
Figure 6:
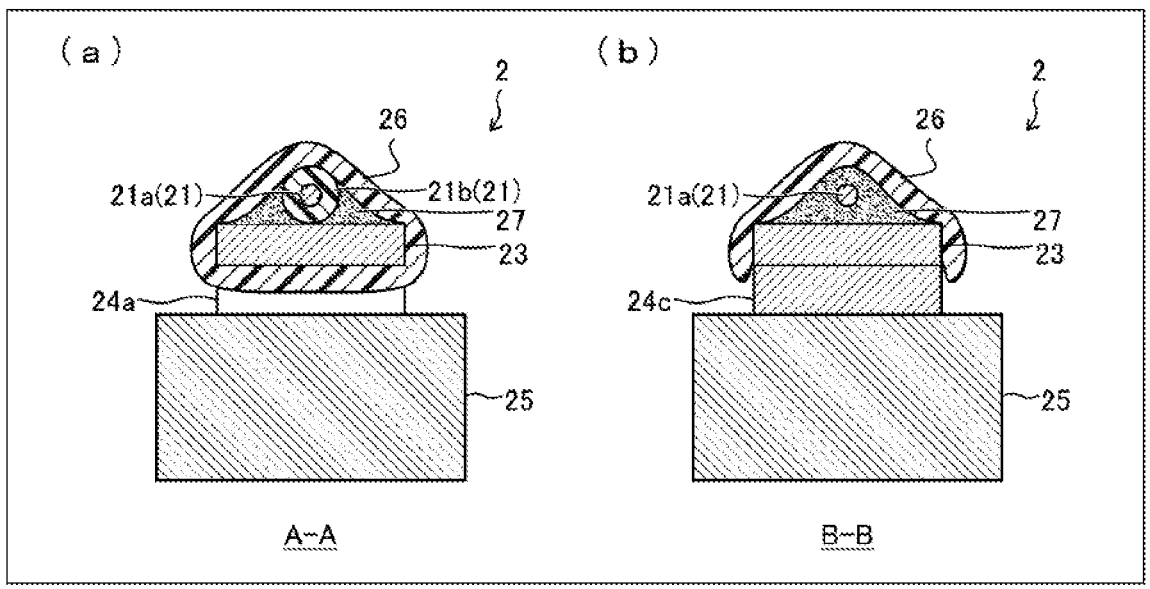
FIG. 6 further illustrates the reinforcement structure illustrated in FIG. 5. (a) of FIG. 6 is a cross-sectional view of an adjacent section the reinforcement structure (taken along line A-A). (b) of FIG. 6 is a cross-sectional view of a jacket-removed section of the reinforcement structure (taken along line B-B).

The following description will discuss, with reference to FIGS. 5 and 6, a reinforcement structure 2 in accordance with Embodiment 2 of the present invention. (a) of FIG. 5 is a top view of the reinforcement structure 2. (b) of FIG. 5 is a right side view of the reinforcement structure 2. (c) of FIG. 5 is a front view of the reinforcement structure 2. (a) of FIG. 6 is a cross-sectional view of the reinforcement structure 2, taken along line A-A. (b) of FIG. 6 is another cross-sectional view of the reinforcement structure 2, taken along line B-B.

The reinforcement structure 2 in accordance with the present embodiment is a structure for reinforcing a fusion splice point P at which an optical fiber 21 and an optical fiber 22 are fusion-spliced. Similarly to the reinforcement structure 1 in accordance with Embodiment 1, the reinforcement structure 2 includes a tension-resistance member 23, a leg part 24a, a leg part 24b, a leg part 24c, a radiator 25, a heat-shrinkable tube 26, and a low-refractive-index resin 27.

The tension-resistance member 23, the leg parts 24a and 24b, the radiator 25, the heat-shrinkable tube 26, and the low-refractive-index resin 27 of the reinforcement structure 2 of the present embodiment respectively correspond to the tension-resistance member 13, the leg parts 14a and 14b, the radiator 15, the heat-shrinkable tube 16, and the low-refractive-index resin 17 of the reinforcement structure 1 of Embodiment 1.

The reinforcement structure 2 of the present embodiment differs from the reinforcement structure 1 of Embodiment 1 in that (i) the leg part 24c is provided to the center of a lower surface of the tension-resistance member 23 and (ii) the heat-shrinkable tube 26 includes a cutout portion 26a through which the leg part 24c is to be passed. The tension-resistance member 23 is in thermal contact with the radiator 25 via the leg part 24a, the leg part 24b, and the leg part 24c.

Light which propagates through the optical fibers 21 and 22 is particularly likely to leak in the vicinity of the fusion splice point P. As such, an amount of heat generated in the tension-resistance member 23 is, relatively, larger in a central portion which overlaps with the fusion splice point P, and smaller at both ends of the tension-resistance member 23. With the above configuration, the tension-resistance member 23 is in thermal contact with the radiator 25 not only at both ends of the tension-resistance member 23, where the amount of heat generated is relatively small, but also at a central portion of the tension-resistance member 23, where the amount of heat generated is relatively large. In comparison to the reinforcement structure 1 of Embodiment 1, this configuration enables even more efficient external dissipation of heat generated in the tension-resistance member 23.

Embodiment 3

Figure 7:
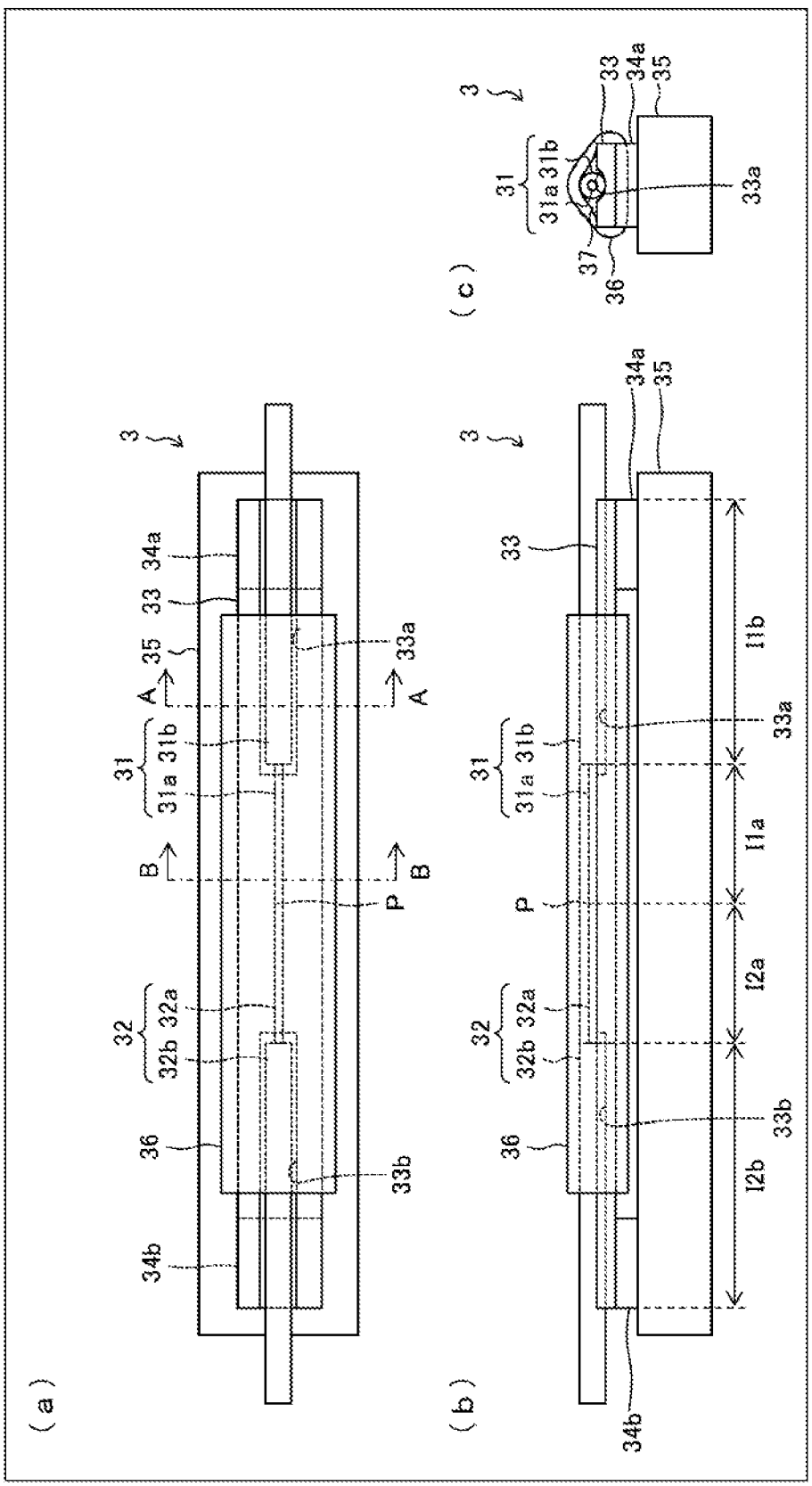
FIG. 7 illustrates a reinforcement structure in accordance with Embodiment 3 of the present invention. (a) of FIG. 7 is a top view of the reinforcement structure. (b) of FIG. 7 is a right side view of the reinforcement structure. (c) of FIG. 7 is a front view of the reinforcement structure.
Figure 8:
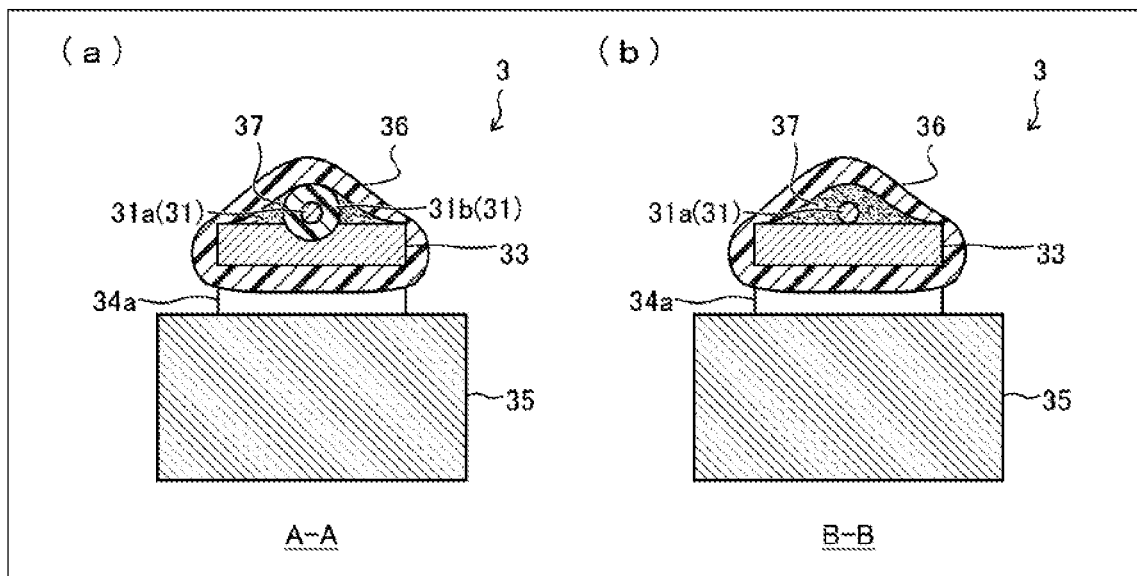
FIG. 8 further illustrates the reinforcement structure illustrated in FIG. 7. (a) of FIG. 8 is a cross-sectional view of an adjacent section the reinforcement structure (taken along line A-A). (b) of FIG. 8 is a cross-sectional view of a jacket-removed section of the reinforcement structure (taken along line B-B).

The following description will discuss, with reference to FIGS. 7 and 8, a reinforcement structure 3 in accordance with Embodiment 3 of the present invention. (a) of FIG. 7 is a top view of the reinforcement structure 3. (b) of FIG. 7 is a right side view of the reinforcement structure 3. (c) of FIG. 7 is a front view of the reinforcement structure 3. (a) of FIG. 8 is a cross-sectional view of the reinforcement structure 3, taken along line A-A. (b) of FIG. 8 is another cross-sectional view of the reinforcement structure 3, taken along line B-B.

The reinforcement structure 3 in accordance with the present embodiment is a structure for reinforcing a fusion splice point P at which an optical fiber 31 and an optical fiber 32 are fusion-spliced. Similarly to the reinforcement structure 1 in accordance with Embodiment 1, the reinforcement structure 3 includes a tension-resistance member 33, a leg part 34a, a leg part 34b, a radiator 35, a heat-shrinkable tube 36, and a low-refractive-index resin 37.

The tension-resistance member 33, the leg parts 34a and 34b, the radiator 35, the heat-shrinkable tube 36, and the low-refractive-index resin 37 of the reinforcement structure 3 of the present embodiment respectively correspond to the tension-resistance member 13, the leg parts 14a and 14b, the radiator 15, the heat-shrinkable tube 16, and the low-refractive-index resin 17 of the reinforcement structure 1 of Embodiment 1.

The reinforcement structure 3 of the present embodiment differs from the reinforcement structure 1 of Embodiment 1 in that (i) U-shaped grooves 33a and 33b for holding the optical fibers 31 and 32 are formed outside the jacket-removed sections Ia1 and Ia2 and (ii) in the jacket-removed sections I1a and I2a, the optical fibers 31 and 32 are in contact with an upper surface of the tension-resistance member 33.

With the above configuration, in the jacket-removed sections I1a and I2a, the optical fibers 31 and 32 have been brought closer to the upper surface of the tension-resistance member 33. This makes is possible to decrease, out of light which leaks from the circumferential surfaces of the optical fibers 31 and 32, a proportion of light which is incident upon the heat-shrinkable tube 36. It is therefore possible to decrease the likelihood of degradation of the heat-shrinkable tube 36 caused by light which leaks from the circumferential surfaces of the optical fibers 31 and 32 and heats the heat-shrinkable tube 36. Furthermore, with the above configuration, because the optical fibers 31 and 32 are in contact with the upper surface of the tension-resistance member 33 in the jacket-removed sections I1a and I2a, it is possible to prevent the optical fibers and 32 from bending in a vertical direction. This makes it possible to prevent an increase in damage which could be caused by bending of the optical fibers 31 and 32.

(Recap)

A reinforcement structure in accordance with an aspect of the present invention is a reinforcement structure for reinforcing a fusion splice point at which a plurality of optical fibers are fusion-spliced, the reinforcement structure including: a tension-resistance member; a heat-shrinkable tube which bundles the plurality of optical fibers and the tension-resistance member; and a radiator which is in thermal contact with the tension-resistance member, the tension-resistance member having a flat surface which faces respective circumferential surfaces of the plurality of optical fibers.

With the above configuration, the optical fiber and the tension-resistance member are bundled together by the heat-shrinkable tube. This makes it possible to reinforce the optical fiber in a simple manner. Furthermore, the tension-resistance member has a flat surface facing the circumferential surface of the optical fiber and is in thermal contact with the radiator. As such, even if light leaks from the circumferential surface of the optical fiber in the heat-shrinkable tube, a large portion of the leaked light is converted into heat in the tension-resistance member, and a large portion of that heat is dissipated via the radiator. It is therefore possible to decrease the likelihood of degradation of the optical fiber caused by light which leaks from the circumferential surface of the optical fiber and heats the optical fiber.

The reinforcement structure in accordance with an embodiment of the present invention is preferably configured such that the heat-shrinkable tube is filled with a low-refractive-index resin whose refractive index is lower than a refractive index of cladding of each of the plurality of optical fibers.

With the above configuration, the heat-shrinkable tube is filled with a low-refractive-index resin whose refractive index in lower than a refractive index of cladding of the optical fiber. This makes it possible to decrease the amount of light which leaks from the circumferential surface of the optical fiber in the heat-shrinkable tube. It is therefore possible to further decrease the likelihood of degradation of the optical fiber caused by light which leaks from the circumferential surface of the optical fiber and heats the optical fiber.

The reinforcement structure in accordance with an embodiment of the present invention is preferably configured such that the tension-resistance member is a plate-like member whose upper surface faces the respective circumferential surfaces of the plurality of optical fibers.

The above configuration makes it possible, without excessively increasing the thickness of the reinforcement structure, to decrease, out of the light which leaks from the circumferential surface of the optical fiber, the proportion of light which is incident upon the heat-shrinkable tube. It is therefore possible to further decrease the likelihood of degradation of the heat-shrinkable tube caused by light which leaks from the circumferential surface of the optical fiber and heats the heat-shrinkable tube.

The reinforcement structure in accordance with an embodiment of the present invention is preferably configured such that the flat surface of the tension-resistance member has a width which is greater than a diameter of each of the plurality of optical fibers.

The above configuration makes it possible to further decrease, out of the light which leaks from the circumferential surface of the optical fiber, the proportion of light which is incident upon the heat-shrinkable tube. It is therefore possible to further decrease the likelihood of degradation of the heat-shrinkable tube caused by light which leaks from the circumferential surface of the optical fiber and heats the heat-shrinkable tube.

The reinforcement structure in accordance with an embodiment of the present invention is preferably configured such that: the heat-shrinkable tube includes a cutout portion; and the tension-resistance member is in thermal contact with the radiator via a leg part which (i) is provided to a lower surface of the tension-resistance member in a region in which the tension-resistance member faces the fusion splice point and (ii) passes through the cutout portion.

The above configuration makes it possible to bring the tension-resistance member into thermal contact with the radiator via the leg part in a region in which the tension-resistance member faces the fusion splice point, i.e., a region of the tension-resistance member in which an amount of generated heat is relatively large. This makes it possible to more efficiently dissipate heat generated in the tension-resistance member.

The reinforcement structure in accordance with an embodiment of the present invention is preferably configured such that a groove for holding the plurality of optical fibers is formed in the upper surface of the tension-resistance member outside a jacket-removed section, such that in the jacket-removed section, the respective circumferential surfaces of the plurality of optical fibers are in contact with the upper surface of the tension-resistance member.

With the above configuration, in the jacket-removed section, the optical fiber has been brought closer to the upper surface of the tension-resistance member. This makes is possible to decrease, out of light which leaks from the circumferential surface of the optical fiber, a proportion of light which is incident upon the heat-shrinkable tube. It is therefore possible to decrease the likelihood of degradation of the heat-shrinkable tube caused by light which leaks from the circumferential surface of the optical fiber and heats the heat-shrinkable tube. Furthermore, with the above configuration, because the optical fiber is in contact with the upper surface of the tension-resistance member in the jacket-removed section, it is possible to prevent the optical fiber from bending in a vertical direction. This makes it possible to prevent an increase in damage which could be caused by bending of the optical fiber.

The reinforcement structure in accordance with an embodiment of the present invention is preferably configured such that the radiator is a water-cooled plate.

The above configuration makes it possible to more efficiently dissipate heat generated in the tension-resistance member.

[Additional Matters]

The present invention is not limited to the foregoing embodiments (examples), but can be altered by a skilled person in the art within the scope of the claims. The present invention also encompasses, in its technical scope, any embodiment derived by combining technical means disclosed in differing embodiments.

REFERENCE SIGNS LIST 11, 12, 21, 22, 31, 32 Optical fiber
11*a*, 12*a*, 21*a*, 22*a*, 31*a*, 32*a* Bare fiber part
11*b*, 12*b*, 21*b*, 22*b*, 31*b*, 32*b* Jacket
13, 23, 33 Tension-resistance member
33*a*, 33*b* U-shaped groove
14*a*, 14*b*, 24*a*, 24*b*, 24*c*, 34*a*, 34*b* Leg part
15, 25, 35 Radiator
16, 26, 36 Heat-shrinkable tube
26*a* Cutout portion
17, 27, 37 Low-refractive-index resin
P Fusion splice point

The invention claimed is:

1. A reinforcement structure for reinforcing a fusion splice point at which a plurality of optical fibers are fusion-spliced, the reinforcement structure comprising:
  a tension-resistance member;
  a heat-shrinkable tube which bundles the plurality of optical fibers and the tension-resistance member; and
  a radiator which is in thermal contact with the tension-resistance member,
  the tension-resistance member having a flat surface which faces respective circumferential surfaces of the plurality of optical fibers,
  wherein the heat-shrinkable tube is filled with a low-refractive-index resin whose refractive index is lower than a refractive index of cladding of each of the plurality of optical fibers.

2. The reinforcement structure according to claim 1, wherein the tension-resistance member is a plate-like member whose upper surface faces the respective circumferential surfaces of the plurality of optical fibers.

3. The reinforcement structure according to claim 1, wherein the flat surface of the tension-resistance member has a width which is greater than a diameter of each of the plurality of optical fibers.

4. The reinforcement structure according to claim 2, wherein:
  the heat-shrinkable tube includes a cutout portion; and the tension-resistance member is in thermal contact with the radiator via a leg part which (i) is provided to a lower surface of the tension-resistance member in a region in which the tension-resistance member faces the fusion splice point and (ii) passes through the cutout portion.

5. The reinforcement structure according to claim 2, wherein a groove for holding the plurality of optical fibers is formed in the upper surface of the tension-resistance member outside a jacket-removed section, such that in the jacket-removed section, the respective circumferential surfaces of the plurality of optical fibers are in contact with the upper surface of the tension-resistance member.

6. The reinforcement structure according to claim 1, wherein the radiator is a water-cooled plate.

7. A reinforcement structure for reinforcing a fusion splice point at which a plurality of optical fibers are fusion-spliced, the reinforcement structure comprising:

a tension-resistance member;

a heat-shrinkable tube which bundles the plurality of optical fibers and the tension-resistance member; and a radiator which is in thermal contact with the tension-resistance member, wherein the tension-resistance member having a flat surface which faces respective circumferential surfaces of the plurality of optical fibers, the heat-shrinkable tube includes a cutout portion, and the tension-resistance member is in thermal contact with the radiator via a leg part which (i) is provided to a lower surface of the tension-resistance member in a region in which the tension-resistance member faces the fusion splice point and (ii) passes through the cutout portion.

\* \* \* \* \*